United States Patent
Nishimaki et al.

(10) Patent No.: US 8,304,059 B2
(45) Date of Patent: Nov. 6, 2012

(54) LAMINATED STRUCTURE FOR MARKING AND METHOD OF FORMING A MARK

(75) Inventors: Kanji Nishimaki, Tokyo (JP); Katsumi Shigeta, Gifu (JP); Yoshiji Aikyo, Tokyo (JP)

(73) Assignee: NSK Echo Mark Co., Ltd., Tokyo (JP)

( * ) Notice: Subject to any disclaimer, the term of this patent is extended or adjusted under 35 U.S.C. 154(b) by 0 days.

(21) Appl. No.: 12/737,033

(22) PCT Filed: Jul. 14, 2009

(86) PCT No.: PCT/JP2009/062740
§ 371 (c)(1),
(2), (4) Date: Dec. 2, 2010

(87) PCT Pub. No.: WO2010/010829
PCT Pub. Date: Jan. 28, 2010

(65) Prior Publication Data
US 2011/0070409 A1    Mar. 24, 2011

(30) Foreign Application Priority Data
Jul. 25, 2008   (JP) .................. 2008-192873

(51) Int. Cl.
B32B 3/00    (2006.01)
B32B 5/00    (2006.01)
B32B 7/00    (2006.01)
B32B 9/00    (2006.01)
B32B 33/00   (2006.01)
B41M 5/00    (2006.01)
B44C 1/17    (2006.01)
G03G 7/00    (2006.01)

(52) U.S. Cl. ....... 428/190; 428/195.1; 428/98; 428/40.1
(58) Field of Classification Search ............. 428/190, 428/195.1, 40, 98
See application file for complete search history.

(56) References Cited

U.S. PATENT DOCUMENTS
6,756,095 B2 *   6/2004  Sandt et al. .............. 428/40.1
7,238,644 B2 *   7/2007  Yukawa et al. ............ 503/227

FOREIGN PATENT DOCUMENTS
| JP | 1-234238 A | 9/1989 |
| JP | 5-351 Y2 | 1/1993 |
| JP | 2000-009735 A | 7/2001 |
| JP | 2001-324928 A | 11/2001 |
| JP | 2008-162116 A | 7/2008 |
| JP | 2009-013556 A | 1/2009 |

OTHER PUBLICATIONS

JP 2009-013556 Machine translation, Pub. Jan. 22, 2009, File Jun. 4, 2008.*

(Continued)

Primary Examiner — Bruce H Hess
Assistant Examiner — Laura C Dettinger
(74) Attorney, Agent, or Firm — Holtz Holtz Goodman & Chick PC

(57) ABSTRACT

A stretchable fabric for marking, having a laminated structure of a first adhesive layer 11 formed of a hot-melt adhesive composed of a thermoplastic polyurethane resin having physical properties including a melting point of 125 to 165° C., a melt viscosity of 8,000 to 15,000 Pa·s at 150° C., and a 100% modulus of 2 to 8 MPa, an interlayer 20 formed of a thermosetting polyurethane resin which is stretchable and opaque, a second adhesive layer 12 formed of the hot-melt adhesive composed of the thermoplastic polyurethane resin having the above-described physical properties, and a surface layer 30 formed of a thermosetting polyurethane resin which is stretchable and transparent, wherein a mark image has been formed on a front surface of the interlayer 20 or on a back surface of the surface layer 30. This fabric for marking is good in adhesion to an adherend and adhesion durability, can sufficiently stretch while conforming to the stretch of the adherend and can form a mark having excellent resistance to color fading.

11 Claims, 5 Drawing Sheets

OTHER PUBLICATIONS

English-language International Preliminary Report on Patentability and Written Opinion of the International Searching Authority, dated Mar. 8, 2011 for International Application PCT/JP2009/062740 filed Jul. 14, 2009; Applicants: NSK Echo Mark Co., Ltd. et al.

* cited by examiner (A)

(B)

(a)

(b)

(c)

(d)

(e)

(f)

(g)

(a)

(b)

(c)

(d)

(e)

(f)

(g)

(A)

(B)

(C)

LAMINATED STRUCTURE FOR MARKING AND METHOD OF FORMING A MARK

This application is the United States national phase application under 35 USC 371 of International Application No. PCT/JP2009/062740 filed Jul. 14, 2009, the entire contents of which are incorporated by reference herein.

TECHNICAL FIELD

The present invention relates to a fabric for marking and a method of forming a mark with the same, and particularly to a fabric for marking (a mark forming fabric) caused to adhere to various kinds of clothes such as casual wears, uniforms and swimming suits to form a mark on the surface of such an adherend as those clothes, and a method of forming a mark on the surface of the adherend with this fabric for marking.

BACKGROUND ART

Marks with a character, figure, symbol and/or the like are used as fashions or for distinguishing or showing one group or team on clothes including uniforms, and all kinds of bags such as handbags and pouches. These marks are mainly caused to adhere to clothes or the like by the following two methods. More specifically, a felt or melton fabric is sewed on an adherend by hand or a sewing machine, or a fabric, such as a knit, cloth or nylon fabric, having a hot-melt layer is processed into a desired form, and the processed fabric is caused to adhere by arranging it in such a manner that the hot-melt layer comes into contact with the clothes, and heating and pressurizing it.

The sewing method permits strong and durable adhesion between the adherend and the mark so far as the mark is basically made of a material through which a needle and yarn can pass. However, this method has involved a problem that the sewed portion is poor to the touch, or the adherend is wrinkled.

As the method of causing the mark to adhere by heating and pressurizing, it is proposed to provide a fabric for marking of a type that the fabric is heat-bonded under pressure with a thermoplastic hot-melt synthetic resin film (Patent Literature 1). This literature relates to a fabric for marking obtained by providing a thermo-compression bonding layer-forming material for being laminated on a marking fabric making up the fabric for marking of the thermo-compression bonding type as a three-layer structure of an intervention layer, which is not melted at each heating and pressurizing operation when the thermo-compression bonding layer-forming material is prepared, it is laminated on the marking fabric, or the marking fabric is caused to adhere to an object of bonding, and thermoplastic hot-melt synthetic resin films arranged on both sides of the intervention layer, and laminating the thermo-compression bonding layer-forming material on the marking fabric. According to this proposal, the adhesives selected according to the object of bonding are separated by the intervention layer, so that both adhesives can be prevented from permeating each other more than need. As a result, both fabrics that are materials for mark and uniform can exhibit the necessary and sufficient anchoring function by the melt resins to stick them on each other. However, this literature does unfortunately not specifically mention materials usable for the thermoplastic hot-melt synthetic resin films described herein and characteristics or properties and physical properties exhibited by the resulting fabric for marking.

There is also proposed a fabric for marking comprising a stretch marking fabric body and a hot-melt component composed of a urethane resin film and laminated on one side of the marking fabric body (Patent Literature 2). This is obtained by laminating the hot-melt component having stretching force even after melted on the marking fabric rich in stretchability. The fabric for marking fabricated in this manner is stuck on a fabric rich in stretching force, whereby the fabric for marking is rich in stretching force even after stuck, is not easily peeled and has sufficient durability against extreme movement. However, this fabric for marking has a structure that the marking fabric appears on an outermost surface, so that it is hard to say that the fabric for marking gives careful consideration to such a problem that when this fabric for marking is used in, for example, a swimming suit, its hue is deteriorated by disinfectant chlorine in a pool, or its color is faded by ultraviolet light when used in a uniform outdoors used in, for example, baseball.

It is further proposed to provide a fabric for marking comprising a hot-melt adhesive layer for marking fabric and a hot-melt adhesive layer for fabric (Patent Literature 3). The object of this proposal is to improve workability by providing hot-melt adhesive layers as a laminated structure and suppressing elongation of a marking fabric body by the hot-melt adhesive layers when the fabric for marking is cut conforming to the shape of a mark. This solves the problems of the conventional fabric for marking (Patent Literature 2 described above) using the hot-melt adhesive layer composed of the polyurethane resin, i.e., problems that the hot-melt adhesive layer elongates together with a marking fabric body when the fabric for marking is cut, so that the cutting work is difficult, and stringiness or bleeding of the hot-melt adhesive layer occurs on the cut surface of the mark to deteriorate the finish of the cut surface.

As described above, in the conventional fabrics for marking, adhesion, stretchability, durability, simplicity and processability and the like have been mainly investigated, and the resistance to color fading of a mark itself has not been mentioned or investigated.

PRIOR ART LITERATURE

Patent Literature

Patent Literature 1: Japanese Patent Application Laid-Open No. 2001-324928
Patent Literature 2: Japanese Patent Application Laid-Open No. 1-234238
Patent Literature 3: Japanese Patent Application Laid-Open No. 2001-200482

DISCLOSURE OF THE INVENTION

Technical Problem

As the result that an investigation has been carried out for solving the problems involved in the above-described prior art, the present invention has been made.

It is an object of the present invention to provide a fabric for marking, which is good in adhesion to an adherend such as clothes and adhesion durability, can sufficiently stretch while conforming to the stretch of the adherend and can form a mark having excellent resistance to color fading.

Another object of the present invention is to provide a method capable of forming a mark excellent in adhesion to an adherend, adhesion durability, stretchability and resistance to color fading.

Solution to Problem

According to the present invention, there is provided a fabric for marking, having a laminated structure comprising:

a first adhesive layer formed of a hot-melt adhesive composed of a thermoplastic polyurethane resin (hereinafter also referred to as "the specific thermoplastic polyurethane resin") having physical properties including a melting point of 125 to 165° C., a melt viscosity of 8,000 to 15,000 Pa·s at 150° C., and a 100% modulus of 2 to 8 MPa, an interlayer laminated on a front surface of the first adhesive layer and formed of a thermosetting polyurethane resin which is stretchable and opaque, a second adhesive layer laminated on a front surface of the interlayer and formed of the hot-melt adhesive composed of the specific thermoplastic polyurethane resin having the physical properties (melting point: 125 to 165° C., melt viscosity: 8,000 to 15,000 Pa·s at 150° C., and 100% modulus: 2 to 8 MPa), and a surface layer laminated on a front surface of the second adhesive layer and formed of a thermosetting polyurethane resin which is stretchable and transparent, wherein a mark image has been formed on the front surface of the interlayer or on a back surface of the surface layer.

The fabric for marking according to the present invention is stuck on a surface of an adherend in such a manner that the first adhesive layer comes into contact with the surface of the adherend and is heat-bonded under pressure, whereby the fabric for marking can be caused to strongly adhere to the surface of the adherend (a mark can be formed).

The fabric for marking according to the present invention is caused to adhere to the surface of the adherend with the hot-melt adhesive forming the first adhesive layer, i.e., the hot-melt adhesive composed of the specific thermoplastic polyurethane resin having a relatively high melting point and a high melt viscosity, so that a mark excellent in adhesion to the adherend and adhesion durability can be formed.

The interlayer and surface layer making up the fabric for marking according to the present invention are both formed of the stretchable thermosetting polyurethane resins, and the hot-melt adhesive (the specific thermoplastic polyurethane resin) forming the first adhesive layer and second adhesive layer becomes a stretchable hot-melt adhesive layer by virtue of its physical properties after adhered to the adherend, so that a mark capable of sufficiently conforming to the stretch of the adherend can be formed by the fabric for marking according to the present invention.

In addition, the mark image of the fabric for marking according to the present invention is formed on the front surface of the interlayer or the back surface of the surface layer and is protected by the surface layer, so that a mark excellent in resistance to color fading can be formed by the fabric for marking according to the present invention.

In the fabric for marking according to the present invention, the following modes are preferred.

(a) The thickness of the first adhesive layer is 50 to 150 μm, the thickness of the interlayer is 10 to 50 μm, the thickness of the second adhesive layer is 10 to 150 μm, and the thickness of the surface layer is 10 to 50 μm.

(b) The mark image is formed by printing on the front surface of the interlayer or the back surface of the surface layer with a dye containing a sublimate dye or pigment.

(c) The surface layer is subjected to at least one working selected from embossing, dimpling and satinizing.

(d) The hot-melt adhesive is composed of a polyester-based thermoplastic polyurethane resin.

(e) The interlayer is a colored layer, particularly, a white-colored layer containing titanium white.

(f) The interlayer is a reflective layer.

(g) A powdery material or fibrous material is caused to be contained or interposed in the interior or on the surface of the second adhesive layer.

(h) A sublimation-preventing layer is provided between the first adhesive layer and the interlayer. Specifically, the fabric for marking has a laminated structure of the first adhesive layer, the sublimation-preventing layer, a third adhesive layer, the interlayer, the second adhesive layer and the surface layer.

(i) A plurality of through-holes are formed.

(j) A plurality of through-holes having a diameter of 500 to 2,500 μm are formed.

(k) A support film is provided on a front surface of the surface layer.

(l) A release film is provided on a back surface of the first adhesive layer.

According to the present invention, there is also provided a fabric for marking, having a laminated structure comprising an adhesive layer formed by a hot-melt adhesive composed of the specific thermoplastic polyurethane resin, and a surface layer laminated on a front surface of the adhesive layer and formed of a thermosetting polyurethane resin which is stretchable and transparent, wherein a mark image has been formed on a back surface of the surface layer.

According to the present invention, there is further provided a method of forming a mark, comprising heat-bonding the fabric for marking according to the present invention under pressure to an adherend under conditions of a pressure of 500 to 2,000 g/cm² and a temperature of 140 to 180° C.

A mark can be formed on the surface of the adherend by such a simple operation.

Advantageous Effects of Invention

According to the fabric for marking of the present invention, a mark satisfactory in adhesion to an adherend such as clothes and adhesion durability, and can sufficiently stretch while conforming to the stretch of the adherend, and having excellent resistance to color fading can be formed.

According to the mark forming method of the present invention, a mark satisfactory in adhesion to an adherend and adhesion durability and excellent in stretchability and resistance to color fading can be formed by such simple method as thermo-compression bonding.

BEST MODE FOR CARRYING OUT THE INVENTION

The present invention will hereinafter be described specifically.

A fabric 1A for marking illustrated in FIG. 1(A) and a fabric 1B for marking illustrated in FIG. 1(B) are obtained by laminating a first adhesive layer 11 formed by a hot-melt adhesive composed of the specific thermoplastic polyurethane resin, a colored layer (an interlayer) 20 formed by a thermosetting polyurethane resin which is stretchable and opaque, a second adhesive layer 12 formed by the hot-melt adhesive composed of the specific thermoplastic polyurethane resin, and a surface layer 30 formed by a thermosetting polyurethane resin which is stretchable and transparent.

A mark image M (imaged portion) making up the fabric for marking according to the present invention may be formed on a front surface of the colored layer 20 as illustrated in FIG. 1(A) or may be formed on a back surface of the surface layer 30 as illustrated in FIG. 1(B).

Figure 1:
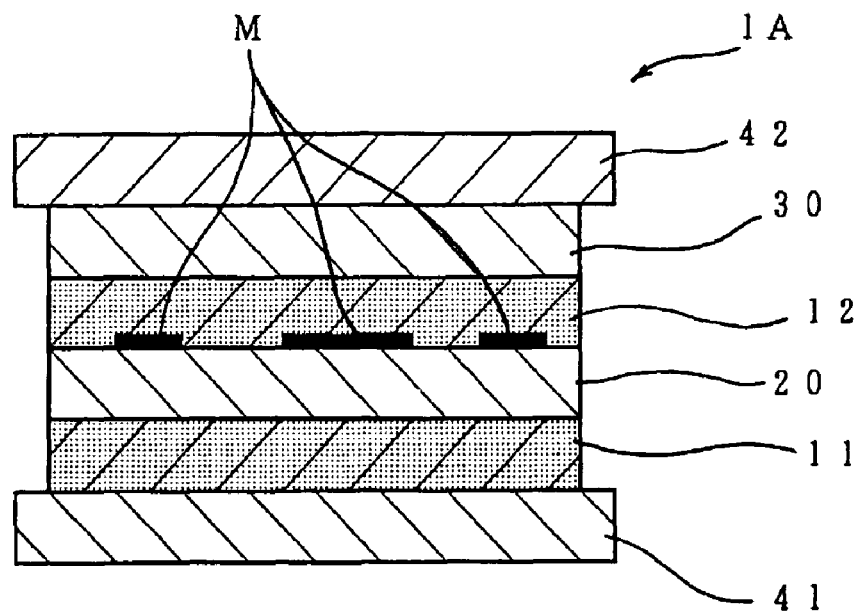
FIG. 1 typically illustrates examples of the layer structure of the fabric for marking according to the present invention.
Figure 1:
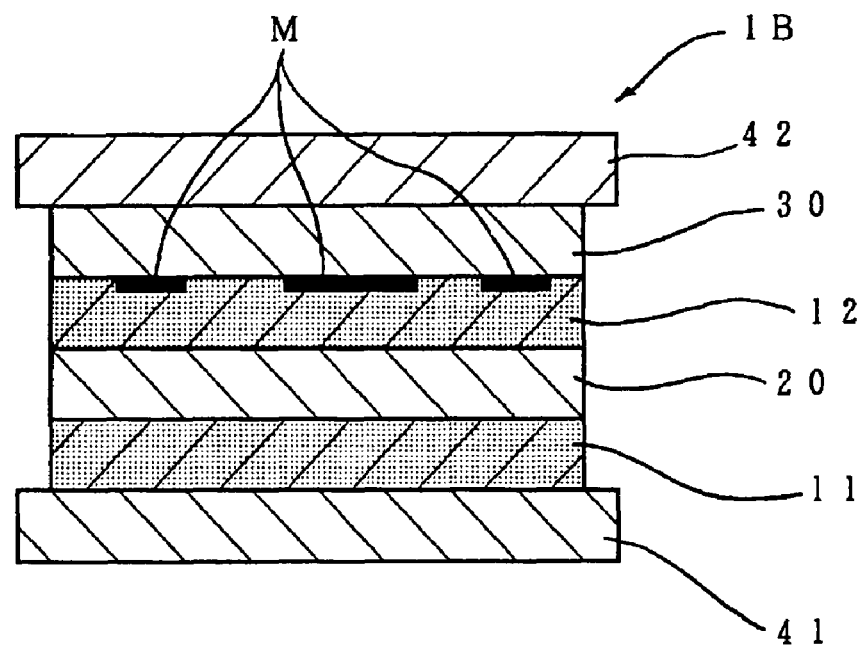
Figure 2:
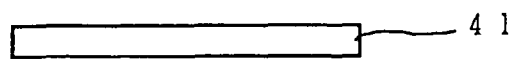
FIG. 2 typically illustrates an exemplary fabrication process of the fabric for marking shown in FIG. 1(A).
Figure 2:
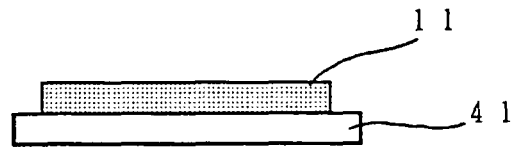
Figure 2:
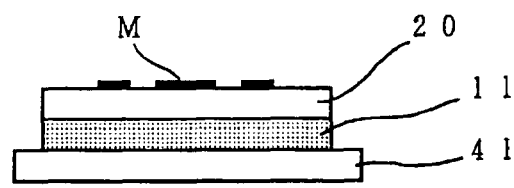
Figure 2:
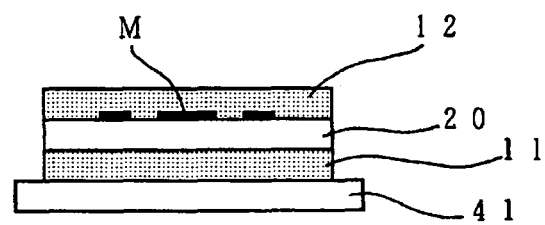
Figure 2:
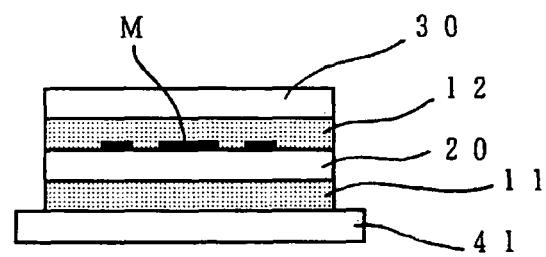
Figure 2:
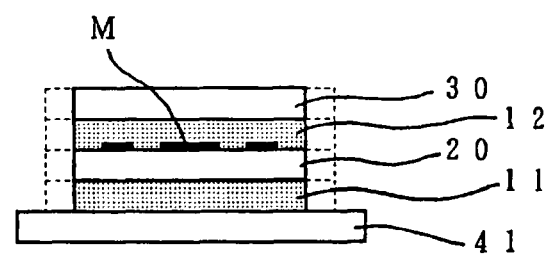
Figure 2:
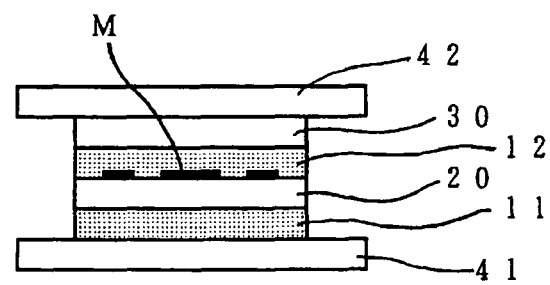
Figure 3:
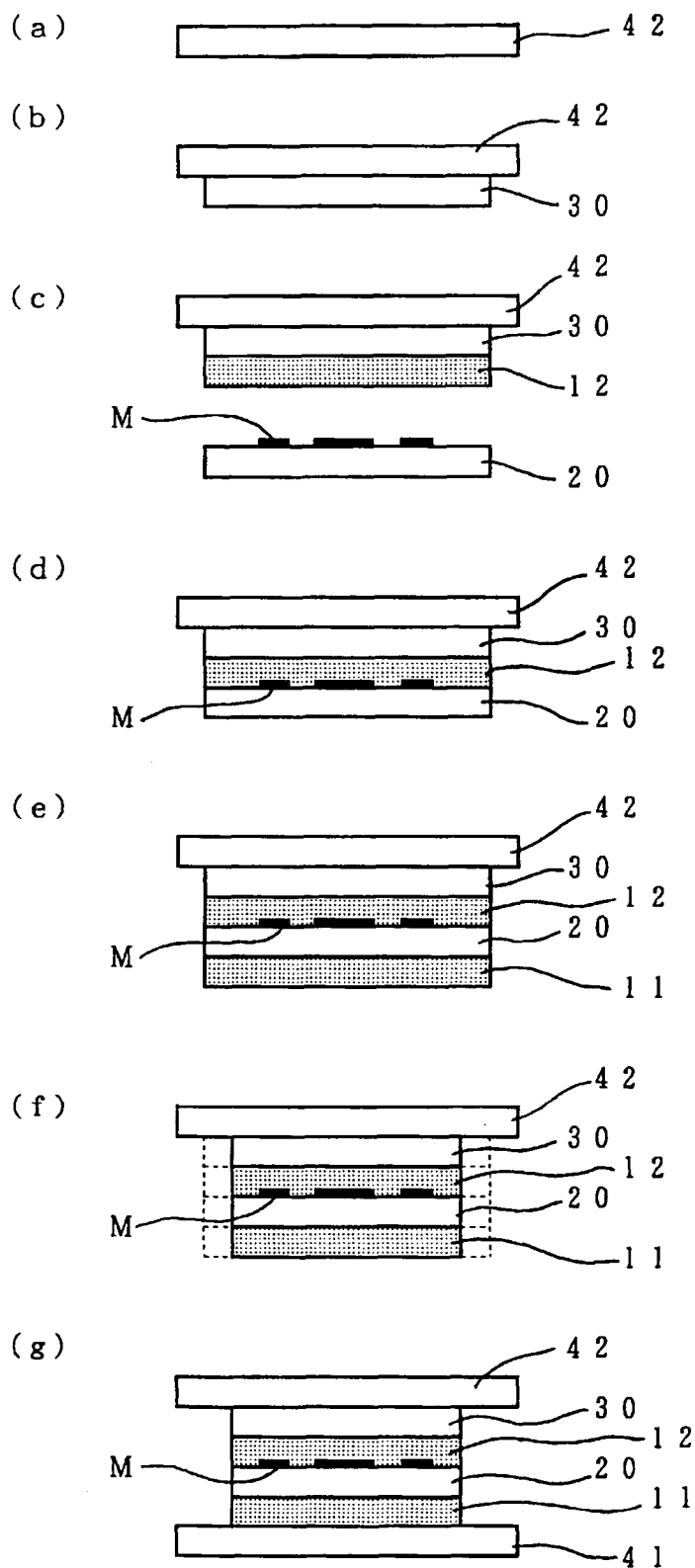
FIG. 3 typically illustrates another exemplary fabrication process of the fabric for marking shown in FIG. 1(A).
Figure 4:
FIG. 4 typically illustrates an exemplary fabrication process of the fabric for marking shown in FIG. 1(B).
Figure 4:
Figure 4:
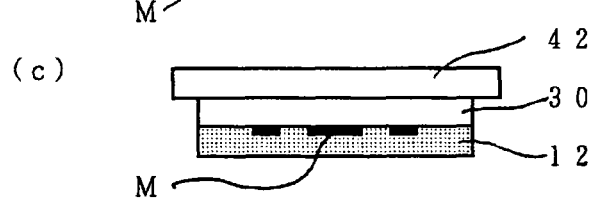
Figure 4:
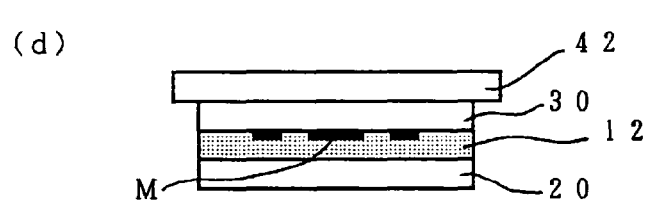
Figure 4:
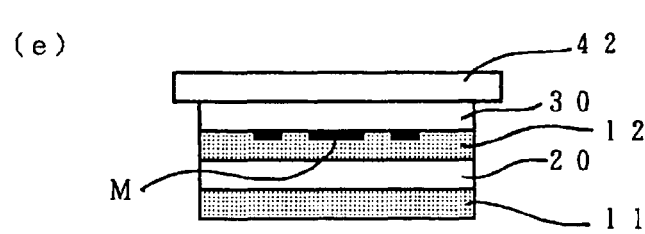
Figure 4:
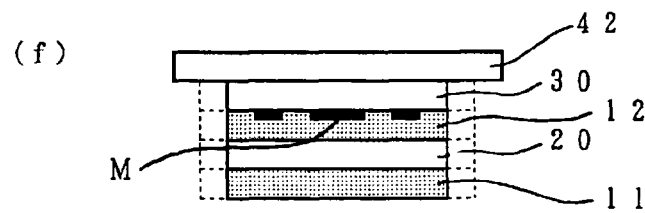
Figure 4:
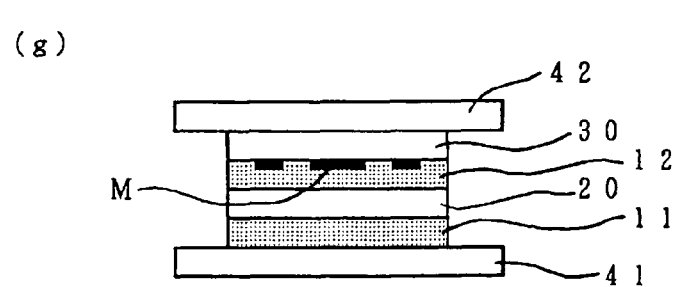

In FIG. 1, a release film 41 and a support film 42 are provided on a back surface of the first adhesive layer 11 and a front surface of the surface layer 30, respectively.

<First Adhesive Layer 11>

The first adhesive layer 11 is formed by a hot-melt adhesive composed of the specific thermoplastic polyurethane resin having physical properties including a melting point of 125 to 165° C., a melt viscosity of 8,000 to 15,000 Pa·s at 150° C., and a 100% modulus of 2 to 8 MPa.

The melting point of the specific thermoplastic polyurethane resin making up the hot-melt adhesive is 125 to 165° C., preferably 135 to 160° C. If this melting point is lower than 125° C., a mark formed by sticking the resulting fabric for marking does not come to have stretchability necessary to conform to the stretch of an adherend. If this melting point exceeds 165° C. on the other hand, there is a possibility that an adherend such as clothes may be adversely affected.

The term "melting point" in the present invention means a temperature at which a subject is deformed by its own weight when measured by a micro melting point apparatus. The melting point of a polyurethane adhesive used in a conventional fabric for marking is generally 90 to 110° C. The fabric for marking according to the present invention features that a thermoplastic polyurethane resin having a melting point higher than the conventional adhesive is used as a hot-melt adhesive used for bonding to an adherend.

The polyurethane adhesives having been used for fabrics for marking to date have been designed so as to match the specification of a device used in bonding of the fabrics for marking under pressure, and those having a low melting point have been selected as the adhesives because short-time bonding is preferred from the viewpoint of productivity. In other words, a polyurethane adhesive having a low melting point is preferably selected when productivity is taken into consideration. However, attention is paid to the fact that when the polyurethane adhesive having a low melting point is used, its permeation into the interior of an adherend is too good, and consequently the stretchability inherent in the polyurethane resin is impaired, and the polyurethane adhesive having a high melting point has be positively selected.

The melt viscosity at 150° C. of the specific thermoplastic polyurethane resin making up the hot-melt adhesive is 8,000 to 15,000 Pa·s, preferably 9,000 to 12,000 Pa·s. The specific thermoplastic polyurethane resin has the above-described melting point (125 to 165° C.), and its melt viscosity at 150° C. is 8,000 to 15,000 Pa·s, whereby a mark formed by sticking the resulting fabric for marking comes to have sufficient adhesion to an adherend and sufficient stretchability to conform to the stretch of the adherend.

The term "melt viscosity" in the present invention indicates the flowability of the hot-melt adhesive heated and melted. The melt viscosity at 150° C. of the polyurethane adhesives used in the conventional fabrics for marking is at most 3,000 to 4,000 Pa·s.

The specific thermoplastic polyurethane resin is higher in melting point and melt viscosity at 150° C. than the polyurethane adhesives used in the conventional fabrics for marking, so that the amount of the resin permeating between fibers of clothes as the adherend upon heat-bonding of the fabric for marking under pressure is moderately suppressed, and a proper amount of the resin remains in the vicinity of a boundary surface between the fabric for marking and the adherend, and good adhesion is achieved without affecting the stretchability of the clothes prior to bonding of the fabric for marking by gradation (concentration gradient) that the concentration of the adhesive is high in the vicinity of the boundary surface between the fabric for marking and the clothes as the adherend and becomes gradually lower toward the interior of the clothes.

The 100% modulus of the specific thermoplastic polyurethane resin making up the hot-melt adhesive is 2 to 8 MPa, preferably 4 to 6 MPa.

If the 100% modulus exceeds 8 MPa, the resulting adhesive layer cannot exhibit sufficient elongation, so that a mark formed by sticking the resulting fabric for marking does not come to have sufficient stretchability. If the 100% modulus is less than 2 MPa on the other hand, the resulting adhesive layer cannot exhibit sufficient elasticity. The term "100% modulus" in the present invention is used as an index indicating flexibility•stretchability. The 100% modulus of the polyurethane adhesive used in the conventionally known fabric for marking is 8.5 to 13 MPa, and the 100% modulus of the specific thermoplastic polyurethane resin is lower than this, and so such a resin may be said to have good stretchability.

Accordingly, the adhesive layer (first adhesive layer) making up the fabric for marking according to the present invention also has good stretchability.

The hot-melt adhesive composed of the specific thermoplastic polyurethane resin is suitably used by forming it in the form of a film. As specific examples thereof, may be mentioned Dan-Fuse (trademark) manufactured by Nitto Boseki Co., Ltd. However, the present invention is not limited thereto.

The hot-melt adhesive formed into the film is formed on a release film 41 composed of PET, thereby obtaining the first adhesive layer 11. As another method for forming the first adhesive layer 11 on the release film 41, there is a method of injection-molding the specific thermoplastic polyurethane resin or dissolving the specific thermoplastic polyurethane resin in an organic solvent and applying this resin solution.

The first adhesive layer 11 formed on the release film 41 exhibits an adhesive effect as the hot-melt adhesive on the fabric for marking on clothes (adherend). In other words, when the fabric for marking according to the present invention is stacked on the clothes, and heat is applied from the side of the fabric for marking, the hot-melt adhesive layer (first adhesive layer 11) is melted by this heat, and the specific thermoplastic polyurethane resin permeates between constituent fibers of the clothes. When the resin is cooled and solidified, both (marking fabric and clothes) are strongly bonded by the so-called anchoring effect. The first adhesive layer 11 composed of the specific thermoplastic polyurethane resin forms the hot-melt adhesive layer of the fabric for marking, and the thickness thereof is preferably 50 to 150 μm, more preferably 60 to 100 μm, particularly preferably 75 to 100 μm. If this thickness is less than 50 μm, there is a possibility that necessary adhesive strength may not be achieved. If this thickness exceeds 150 μm, the massiveness of the resulting fabric for marking is increased to make a user to possibly feel uncomfortable in wearing of the clothes to which this fabric is caused to adhere.

The hot-melt adhesive (specific thermoplastic polyurethane resin) forming the first adhesive layer 11 is preferably composed of a polyester-based polyurethane resin.

By using the polyester-based polyurethane resin, an adhesive layer good in chlorine resistance can be formed, whereby the adhesive is not eroded even by disinfectant chlorine in a pool to successfully provide a fabric for marking suitable for use in an adherend such as a swimming suit.

In order to obtain the specific thermoplastic polyurethane satisfying the above-described physical property values (melting point, melt viscosity and modulus), a polyester polyol is preferably used as a polyol component.

The polyester-based polyurethane resin is obtained by a reaction of the polyester polyol and a diisocyanate.

The polyester polyol used for obtaining the polyester-based polyurethane resin is obtained by polycondensation of a dicarboxylic acid and a polyhydric alcohol.

Examples of the dicarboxylic acid used for obtaining the polyester polyol include aromatic dicarboxylic acids such as terephthalic acid, isophthalic acid, 2,2'-biphenyldicarboxylic acid and 4,4'-diphenyl ether dicarboxylic acid, aliphatic dicarboxylic acids such as adipic acid, dodecanedioic acid and sebacic acid, and alicyclic dicarboxylic acids such as cyclohexanedicarboxylic acid. These compounds may be used either singly or in any combination thereof. In the present invention, the aliphatic dicarboxylic acids such as adipic acid are preferred.

Examples of the polyhydric alcohol used for obtaining the polyester polyol include aliphatic diols such as ethylene glycol, 1,3-propanediol, 1,4-butane-diol, 1,5-hexanediol, 2-methyl-1,3-propanediol, diethylene glycol and triethylene glycol, alicyclic diols such as 1,4-cyclohexanedimethanol, and polyoxyalkylene glycols such as polyoxypropylene glycol, polyoxyethylene glycol, polyoxybutylene glycol, polyoxyethylene-polyoxypropylene glycol and polyoxyethylene-polyoxybutylene glycol. These compounds may be used either singly or in any combination thereof. In the present invention, diethylene glycol, 1,4-butanediol, and polyoxypropylene glycol and polyoxybutylene glycol having a molecular weight of 200 to 2,000 are preferred.

Any diisocyanate of aliphatic, alicyclic and aromatic diisocyanates may be used as the diisocyanate used in the reaction with the polyester polyol for obtaining the specific thermoplastic polyurethane resin. Specific examples thereof include aliphatic diisocyanates such as hexamethylene-1,6-diisocyanate, 2-methylpentamethylene-1,5-diisocyanate and 2-ethylbutylene-1,4-diisocyanate and mixtures of 2 or more of those compounds, alicyclic diisocyanates such as isophorone-diisocyanate, 1,4-cyclohexane-diisocyanate and 1-methyl-2,4- and -2,6-cyclohexane-diisocyanates, and aromatic isocyanates such as 2,4-toluylene-diisocyanate, mixtures of 2,4- and 2,6-toluylene-diisocyanates and 1,5-naphthylene-diisocyanate. Among these, hexamethylene-1,6-diisocyanate, isophorone-diisocyanate and 4,4'-diphenylmethane-diisocyanate are preferred, with 4,4'-diphenylmethane-diisocyanate being particularly preferred.

A trifunctional or higher polyfunctional polyisocyanate may be added to the diisocyanate in a concentration range of, for example, 3 mol % or less, preferably 1 mol % or less based on the total mol of the diisocyanate. However, this amount must be controlled in such a manner that a thermoplastic polyurethane resin is obtained. When the polyfunctional polyisocyanate is used in a great amount, the resulting polyurethane resin becomes thermosetting, and so the function as the adhesive is hard to be achieved. When such a polyfunctional polyisocyanate is added, a monofunctional compound (molecular weight modifier) having an active hydrogen atom may also be used in combination to inhibit a chemically crosslinking reaction of the resulting polyurethane. Examples of the polyfunctional polyisocyanate include polyphenyl-polymethylene-polyisocyanate.

A monoamine such as butylamine, dibutylamine, stearylamine or pyrrolidone, or a monohydric alcohol such as butanol, octanol or cyclohexanol is suitable for use as the monofunctional compound having an active hydrogen atom used for controlling the molecular weight.

The dicarboxylic acid is reacted with the polyhydric alcohol to prepare a polyester polyol, and the resultant polyester polyol is reacted with the diisocyanate, whereby the polyester-based polyurethane resin (specific thermoplastic polyurethane resin) that is the hot-melt adhesive can be obtained.

<Colored Layer (Interlayer) 20>

The colored layer 20 making up the fabric 1A or 1B for marking according to the present invention as illustrated in FIG. 1 is composed of a thermosetting polyurethane resin which is stretchable, opaque and colored.

Since this colored layer 20 is opaque and colored, it can screen the base color of the adherend (clothes) and can make the design of the mark effectively conspicuous (improve the identifiability of the mark).

The colored layer 20 is formed by the thermosetting polyurethane resin.

No particular limitation is imposed on a polyol used for obtaining the thermosetting polyurethane resin forming the colored layer 20, and as examples thereof, may be mentioned polyether polyols, polyester polyols, polycarbonate polyols and polycaprolactone polyols.

No particular limitation is imposed even on a diisocyanate used for obtaining this thermosetting polyurethane resin, and as examples thereof, may be mentioned to tolylene diisocyanate, diphenylmethane diisocyanate and hexamethylene diisocyanate.

The color of the colored layer 20 may be suitably selected from white, red, black, etc. in view of the design of the mark, and various kinds of pigments or dyes are caused to be contained in the thermosetting polyurethane resin, whereby variously colored thermosetting polyurethane resins (colored layer 20) can be formed.

In particular, a white-colored layer 20 formed of a thermosetting polyurethane resin containing titanium white has a high effect to screen the base color and can clearly express the design printed on the surface.

The thickness of the colored layer 20 is preferably as thin as possible within limits satisfying a durability. Specifically, the thickness is preferably 10 to 50 μm, more preferably 15 to 30 μm, particularly preferably 20 to 30 μm. If this thickness is less than 10 μm, there is a possibility that the durability of the resulting fabric for marking may be impaired. If this thickness exceeds 50 μm on the other hand, there is a possibility that the comfortableness to wear of clothes to which a fabric for marking having such a colored layer is caused to adhere may be impaired.

The white-colored layer 20 can be obtained by, for example, mixing a polyol and a diisocyanate, adding titanium white to the resultant mixture in a proportion of 3 to 5% and forming a sheet having a thickness of 20 to 30 μm from the resultant thermosetting polyurethane resin.

A mark image M of a desired design is formed on a front surface of the colored layer 20 in the fabric 1A for marking illustrated in FIG. 1(A).

No particular limitation is imposed on a method of forming the mark image M. However, there may preferably be mentioned a method of forming the mark image by printing with a dye containing a sublimate dye or pigment. For example, the front surface of the colored layer 20 is subjected to color printing by means of a laser printer or the like, whereby the mark image of the desired design can be easily formed.

<Second Adhesive Layer 12>

The second adhesive layer 12 making up the fabric 1A or 1B for marking according to the present invention as illustrated in FIG. 1 is formed by a hot-melt adhesive composed of the specific thermoplastic polyurethane resin (melting point: 125 to 165° C., melt viscosity: 8,000 to 15,000 Pa·s at 150° C., and 100% modulus: 2 to 8 MPa). The hot-melt adhesive used for forming the second adhesive layer 12 is composed of basically the same material as that used for forming the first adhesive layer 11.

The thickness of the second adhesive layer 12 is preferably 10 to 150 μm, more preferably 25 to 100 μm and preferably thinner than the thickness of the first adhesive layer 11.

The second adhesive layer 12 is an adhesive layer for bonding the colored layer 20 to a surface layer 30 which will be described subsequently and can improve adhesive strength between both more than direct forming of the surface layer 30 on a front surface of the colored layer 20. In particular, when the mark image M is formed on the front surface of the colored layer 20 as illustrated in FIG. 1(A), such adhesive strength as durability can be satisfied is hard to be achieved when it is intended to directly form the surface layer 30 on this front surface, so that it is effective to provide the second adhesive layer 12.

Since the fabric for marking according to the present invention is required to sufficiently stretch while conforming to the stretch of an adherend (clothes), and may be overstretched during use of the adherend, it is necessary that the fabric for marking is integrally formed as a whole. Thus, the second adhesive layer 12 is an essential component in this embodiment.

The second adhesive layer 12 is generally a colorless and transparent or colored and transparent resin layer. However, a powdery material or fibrous material having glossiness such as gold or silver may be caused to be contained or interposed in the interior or on the surface of the second adhesive layer 12. A decorative effect on the mark image viewed from a front side can be thereby improved.

<Surface Layer 30>

The surface layer 30 making up the fabric 1A or 1B for marking according to the present invention as illustrated in FIG. 1 is composed of a thermosetting polyurethane resin which is stretchable and transparent.

As the thermosetting polyurethane resin (polyol-diisocyanate) forming the surface layer 30, may be mentioned the same resin as the resin component forming the colored layer 20.

The surface layer 30 is required to be transparent, i.e., be able to see the mark image M located on a back side thereof through it. The surface layer 30 may be either colorless and transparent or colored and transparent. The thickness of the surface layer 30 is preferably 10 to 50 μm, more preferably 15 to 30 μm.

In the fabric 1B for marking illustrated in FIG. 1(B), a mark image M of a desired design is formed on a back surface of the surface layer 30. No particular limitation is imposed on a method of forming the mark image M. However, there may preferably be mentioned a method of forming the mark image by printing with a dye containing a sublimate dye or pigment.

The mark image M can be protected by the surface layer 30 in either mode of the layer structure that the mark image M has been formed on the front surface of the colored layer 20 as illustrated in FIG. 1(A) and the layer structure that the mark image M has been formed on the back surface of the surface layer 30 as illustrated in FIG. 1(B). Accordingly, the mark formed by the fabric for marking according to the present invention comes to be excellent in resistance to color fading.

The surface layer 30 may be subjected to at least one working selected from the group consisting of embossing, dimpling and satinizing. Examples of the working for forming a satinized surface include blasting, discharging, lapping and laser beam machining, and the surface roughness of the surface layer can be delicately varied. Irregularities are formed in the surface by such working to make the surface have a function of diffusing or scattering light reflected by the surface so as to make the mark image M viewed from the front side conspicuous or blurry, whereby the mark image M can be expressed more beautifully.

The fabric 1A or 1B for marking illustrated in FIG. 1 is obtained by laminating the first adhesive layer 11, the colored layer 20, the second adhesive layer 12 and the surface layer 30.

The lamination is preferably conducted under conditions of a temperature of 120 to 180° C., a pressure of 300 to 800 g/cm$^2$ and a heating and pressuring time of about 30 to about 60 seconds. The fabric for marking is fabricated by such a simple and easy method and then worked into a desired mark form.

<Release Film 41 and Support Film 42>

The fabric 1A or 1B for marking illustrated in FIG. 1 has a laminated structure (4-layer structure) of the first adhesive layer 11, the colored layer 20, the second adhesive layer 12 and the surface layer 30. However, these layers are developed on the surface of a hard release film 41 formed of a PET film or the like to form a laminated sheet body.

The fabric for marking is developed on the surface of the release film 41, whereby a cutting work by a cutting plotter or the like can be easily conducted. More specifically, the specific thermoplastic polyurethane resin forming the first adhesive layer 11 and the second adhesive layer 12, and the thermosetting polyurethane resin forming the colored layer 20 and the surface layer 30 are each soft or flexible at room temperature. It is thus difficult to cut these layers in the laminated state into a desired form. Therefore, the fabric for marking of the 4-layer structure is developed and formed on the surface of the release film 41, whereby the hard release film 41 and the soft fabric for marking can be easily cut by the cutting plotter or the like in a state that both release film 41 and fabric for marking have been laminated by moderate adhesive force.

A support film 42 formed of a PET film or the like is stuck on a surface (the front surface of the surface layer 30) of the fabric for marking cut into the desired size, and the release film 41 is peeled from the fabric (the back surface of the first adhesive layer 11) for marking, the first adhesive layer 11 is applied to a desired position of an adherend, and the fabric is then heated and pressurized from the side of the support film 42, whereby the fabric for marking can be stuck on the adherend to form an intended mark.

Incidentally, the materials for forming the release film 41 and the support film 42 are not limited to PET, and they may be formed by various kinds of resin materials or paper.

The fabric 1A for marking according to the present invention as illustrated in FIG. 1(A) can be fabricated according to a process illustrated in FIG. 2(a) to FIG. 2(g) as an example.

(a) A release film 41 formed of a PET film is first provided, and (b) a first adhesive layer 11 formed of the specific thermoplastic polyurethane resin is formed on a front surface of the release film 41. The first adhesive layer 11 participates in bonding to an adherend as a hot-melt adhesive layer. Methods of forming the first adhesive layer 11 include a method of laminating the specific thermoplastic polyurethane resin (hot-melt adhesive) formed in the form of a film and a method of dissolving the specific thermoplastic polyurethane resin in an organic solvent and applying this resin solution to the front surface of the release film 41. The first adhesive layer may also be formed by injection molding, compression molding or the like. (c) A colored layer 20 is then brought into close contact with the first adhesive layer by a laminator, and a mark image M of a desired design is formed on a front surface of this colored layer 20 by printing by means of an ink jet printer or the like. The ink jet printer is used, whereby various colors and designs may be freely selected, to say nothing a single-color mark.

(d) A second adhesive layer 12 is then formed on a front surface of the colored layer 20, on which the mark image M has been formed. The second adhesive layer 12 is an adhesive layer for improving adhesive strength between the colored layer 20 and a surface layer 30, which will be laminated subsequently. As a method of forming the second adhesive layer 12, may be adopted the same method as the method for forming the first adhesive layer 11. (e) The surface layer 30 is then formed on a front surface of the second adhesive layer 12. This surface layer 30 is a surface-protecting layer for protecting the mark image M and improving the resistance to color fading of the mark.

(f) After the resultant laminated structure of the release film 41, the first adhesive layer 11, the colored layer 20, the second adhesive layer 12 and the surface layer 30 is then heated and pressurized for a minute under conditions of, for example, 160° C. and 500 g/cm² to fabricate a fabric for marking, the fabric is worked into a desired mark form by a cutting plotter or the line. (g) A support film 42 is then stuck on a front surface of this fabric for marking (the surface layer 30), thereby obtaining the fabric 1A for marking according to the present invention of the layer structure illustrated in FIG. 1(A).

Upon use of the fabric 1A for marking thus obtained, the release film 41 is peeled, the back surface of the first adhesive layer 11 is superimposed on a desired position of an adherend, and the fabric 1A for marking is heated and pressurized from the side of the support film 42, and the support film 42 is then peeled, whereby the fabric 1A for marking is stuck (transferred) to the adherend.

The fabric 1A for marking according to the present invention as illustrated in FIG. 1(A) can be fabricated according to a process illustrated in FIG. 3(a) to FIG. 3(g) as another example.

(a) A support film 42 formed of a PET film is provided.
(b) A surface layer 30 is laminated on a back surface of the support film 42.
(c) A second adhesive layer 12 is laminated on a back surface of the surface layer 30. On the other hand, the mark image M is formed on a front surface of a colored layer 20 by printing by means of an ink jet printer.
(d) The front surface of the colored layer 20, on which the mark image M has been formed, and a back surface of the second adhesive layer 12 laminated on the surface layer 30 are brought into contact with each other and laminated, thereby obtaining a laminated structure of the support film 42, the surface layer 30, the second adhesive layer 12 and the colored layer 20.
(e) A first adhesive layer 11 is laminated on a back surface of the colored layer 20 making up this laminated structure, thereby obtaining a laminated structure of the support film 42, the surface layer 30, the second adhesive layer 12, the colored layer 20 and the first adhesive layer 11.

(f) This laminated structure is cut by a cutting plotter or the like.
(g) The release film 41 is stuck on a back surface of the first adhesive layer 11 making up this laminated structure, thereby obtaining the fabric 1A for marking according to the present invention of the layer structure illustrated in FIG. 1(A).

The fabric 1B for marking according to the present invention as illustrated in FIG. 1(B) can be fabricated according to a process illustrated in FIG. 4(a) to FIG. 4(g) as an example.

(a) The support film 42 formed of a PET film is provided.
(b) The surface layer 30 is laminated on a back surface of the support film 42. The mark image M is formed on a back surface of this surface layer 30 by printing by means of an ink jet printer.
(c) The second adhesive layer 12 is formed on a back surface of the surface layer 30, on which the mark image M has been formed.
(d) The colored layer 20 is formed on a back surface of the second adhesive layer 12.
(e) The first adhesive layer 11 is formed on a back surface of the colored layer 20, thereby obtaining a laminated structure of the support film 42, the surface layer 30, the second adhesive layer 12, the colored layer 20 and the first adhesive layer 11.
(f) This laminated structure is cut by a cutting plotter or the like.
(g) The release film 41 is stuck on a back surface of the first adhesive layer 11 making up this laminated structure, thereby obtaining the fabric 1B for marking according to the present invention of the layer structure illustrated in FIG. 1(B).

In the fabric 1A or 1B for marking illustrated in FIG. 1, the first adhesive layer fulfills an adhesive function as a hot-melt adhesive layer to clothes and is bonded to the clothes without impairing the stretchability of the fabric for marking, so that the clothes, on which the mark has been formed, come to have excellent hand and comfortableness to wear. With respect to a method of bonding this mark, the fabric for marking is heat-bonded under pressure to the clothes under conditions of a pressure of 500 to 2,000 g/cm², a temperature of 140 to 180° C. and a heating and pressurizing time of several seconds to several tens seconds, whereby the mark can be easily bonded to the clothes.

This method is greatly different from the conventional method for bonding the fabric for marking in that the temperature and pressure conditions of the conventional method are 140 to 150° C. and 200 to 400 g/cm², respectively. The reason for this is that the melting point and melt viscosity of the polyurethane adhesive used conventionally are greatly different from those in the present invention.

The stretchable fabrics 1A and 1B for marking according to the present invention formed in the above-described manner are excellent in adhesive force to an adherend (clothes) and very high in product value.

Even when the fabric 1A or 1B for marking according to the present invention is bonded to clothes such as a sportswear, which is frequently stretched, this fabric stretches together with the sportswear, so that the fabric gives a feeling of a fit to the body upon wearing. In addition, since the mark image has been formed on a surface (a front surface of the colored layer or a back surface of the surface layer) of the stretchable thermosetting polyurethane resin, the mark itself has stretchability, and so the mark image does not cause separation or cracking unlike the conventional marks.

In the fabric for mark according to the present invention, layer(s) may be further increased in addition to the 4-layer structure of the first adhesive layer, the colored layer, the second adhesive layer and the surface layer as necessary for the end application intended. A fabric for marking of a 2-layer structure, which will be described subsequently and has neither the colored layer nor the second adhesive layer, is also included in the present invention.

Figure 5:
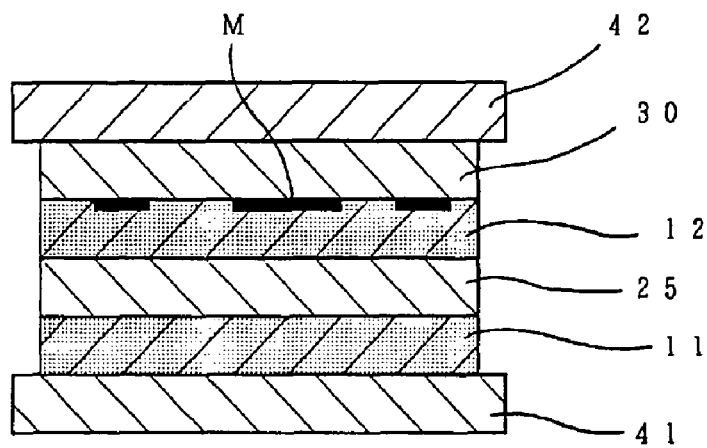
FIG. 5 typically illustrates other examples of the layer structure of the fabric for marking according to the present invention.
Figure 5:
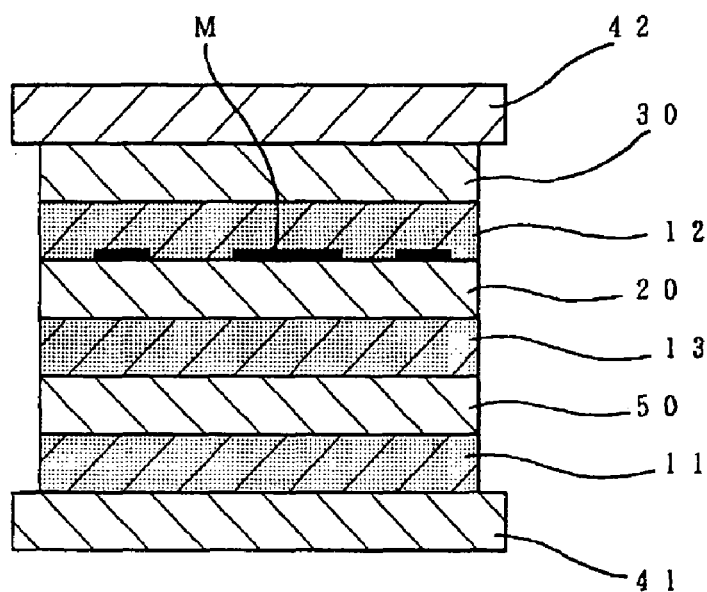
Figure 5:
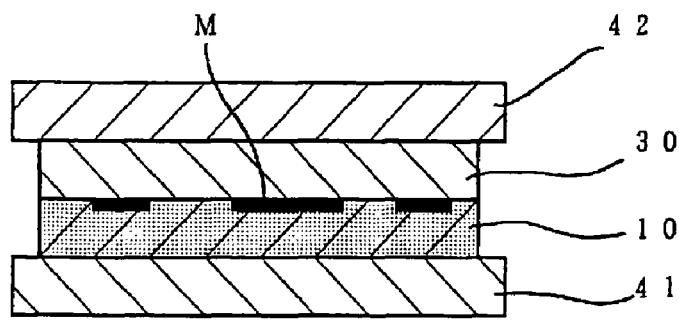

Other embodiments of the fabric for marking according to the present invention will hereinafter be described. Incidentally, in FIG. 5, the same characters are given to the same components (layers) as those illustrated in FIG. 1.

The fabric for marking according to the present invention as illustrated in FIG. 5(A) is obtained by laminating the first adhesive layer 11, a reflective layer (interlayer) 25 formed of a thermosetting polyurethane resin which is stretchable, the second adhesive layer 12 and the surface layer 30, and the reflective layer 25 is formed as the interlayer in place of the colored layer 20 in the fabric for marking illustrated in FIG. 1(*a*).

The reflective layer 25 making up this fabric for marking can be formed by containing reflective beads or the like in the stretchable thermosetting polyurethane resin.

The reflective layer 25 is formed as the interlayer, whereby the background of the mark becomes a reflective surface when the mark image is viewed from a front side to improve a decorative effect.

The fabric for marking according to the present invention as illustrated in FIG. 5(B) is obtained by laminating the first adhesive layer 11, a sublimation-preventing layer 50, a third adhesive layer 13, the colored layer 20, the second adhesive layer 12 and the surface layer 30 and has a feature that the sublimation-preventing layer 50 is provided between the first adhesive layer 11 and the colored layer 20.

The sublimation-preventing layer 50 is a layer having a function of absorbing, adsorbing or shielding a sublimate dye (disperse dye), and as examples thereof, may be mentioned a layer obtained by mixing an adsorbent such as activated carbon into a thermoplastic resin and a layer (barrier layer) formed of a material (for example, Matsumin Undercoat Binder UMB manufactured by MATSUI SHIKISO CHEMICAL CO., LTD.) which is stretchable and does not transmit the sublimate dye.

The third adhesive layer 13 is an adhesive layer for bonding the colored layer 20 to the sublimation-preventing layer 50, and the third adhesive layer 13 may not be provided when the colored layer and the sublimation-preventing layer are directly hot-pressed.

When the fabric for marking is stuck (heat-bonded under pressure) on clothes (adherend) dyed with a sublimate dye, the mark image M and/or the colored layer 20 may be contaminated with the dye sublimated by heating. However, such contamination can be surely prevented by interposing the sublimation-preventing layer 50.

The fabric for marking according to the present invention as illustrated in FIG. 5(C) has a laminated structure of an adhesive layer 10 formed by a hot-melt adhesive composed of the specific thermoplastic polyurethane resin and the surface layer 30 formed of a thermosetting polyurethane resin which is stretchable and transparent, and is a fabric for marking of a 2-layer structure that the mark image M has been formed on a back surface of the surface layer 30 by printing.

The adhesive layer 10 has the same constitution as the first adhesive layer 11 making up the fabric for marking illustrated in FIG. 1.

This fabric for marking is thin and rich in stretchability, and the comfortableness to wear of clothes, to which this fabric has been bonded, becomes better. Since the mark image M is protected by the surface layer 30, the resistance to color fading of the mark is also good.

A plurality of through-holes may be formed in the fabric for marking according to the present invention. The air permeability of the mark is thereby ensured, and clothes, on which such a mark has been formed, are good in comfortableness to wear. According to the fabric for marking, in which the through-holes have been formed, the stretchability and flexibility of the mark can be more improved.

No particular limitation is imposed on the form of the through-holes, and various forms such as a circle and polygons may be adopted. No particular limitation is also imposed on the size of the through-holes, and the size may be freely determined according to uses, objects, etc.

Here, as preferable through-holes, may be mentioned circular through-holes having a diameter of 500 to 2,500 μm.

If the same through-holes are formed in the conventional fabric for marking, the adhesive layer of the fabric for marking melts and flows toward the through-holes when the fabric for marking is stuck (heat-bonded under pressure) on an adherend, so that such a fabric involves a problem that the through-holes are closed, or the opening area of through-holes is reduced.

However, in the fabric for marking according to the present invention, the hot-melt adhesive forming the adhesive layer (first adhesive layer 11, second adhesive layer 12 or adhesive layer 10) is formed of the specific thermoplastic polyurethane resin high in melting point and melt viscosity (150° C.), so that the adhesive layer is hard to flow even when the fabric for marking is stuck (heat-bonded under pressure), and so the through-holes formed can be prevented from being closed to inhibit the reduction of the opening area of the through-holes.

No particular limitation is imposed on a method for forming the through-holes in the fabric for marking. However, it is preferable to adopt a forming method by press working or laser beam machining, not a forming method by a heated needle system, for permitting forming through-holes having an even diameter and causing no bank of the adhesive around the through-holes.

In such a fabric for marking of the 4-layer structure as illustrated in FIG. 1, the through-holes are formed so as to extend from the back surface of the first adhesive layer 11 to the front surface of the surface layer 30, and the through-holes may be formed in the support film 42.

EXAMPLES

The present invention will hereinafter be described by the following Examples. However, the present invention is not limited thereto.

Example 1

The following materials were used to fabricate a fabric for marking according to the present invention in accordance with the following process.

(Materials)

First adhesive layer (11): A filmy hot-melt adhesive "Dan-Fuse (trademark)" (manufactured by Nitto Boseki Co., Ltd, thickness: 75 μm) composed of a polyester-based polyurethane resin having a melting point of 150° C., a melt viscosity of 11,800 Pa·s at 150° C. and a 100% modulus of 4.0 MPa.

Second adhesive layer (12): A filmy hot-melt adhesive "Dan-Fuse (trademark)" (manufactured by Nitto Boseki Co., Ltd, thickness: 50 μm) composed of a polyester-based polyurethane resin having a melting point of 150° C., a melt viscosity of 11,800 Pa·s at 150° C. and a 100% modulus of 4.0 MPa.

Colored layer (20): A stretchable and white thermosetting polyurethane resin film (thickness: 25 μm) obtained by reacting a polycarbonate polyol with a diisocyanate in the presence of titanium white.

Surface layer (30): A stretchable, colorless and transparent thermosetting polyurethane resin film (thickness: 20 μm) obtained by reacting a polycarbonate polyol with a diisocyanate.

Support film (42): A PET film (thickness: 100 μm).

(Fabrication Process)

The surface layer (30) was laminated on a back surface of the support film (42), and the second adhesive layer (12) was further laminated on a back surface of the surface layer (30).

On the other hand, a mark image was formed on a front surface of the colored layer (20) by printing by means of an ink jet printer, a front surface of the colored layer (20), on which the mark image had been formed, was brought into contact with a back surface of the second adhesive layer (12) laminated on the surface layer (30) to laminate and stick them on each other, and the first adhesive layer (11) was further laminated on a back surface of the colored layer (20), thereby obtaining a laminated structure of the support film (42), the surface layer (30), the second adhesive layer (12), the colored layer (20) and the first adhesive layer (11).

The thus-obtained laminated structure was cut by a cutting plotter, thereby obtaining a fabric for marking according to the present invention of the structure (however, a state that no release film 41 was stuck) illustrated in FIG. 1(A).

Example 2

A fabric for marking according to the present invention was fabricated in the same manner as in Example 1 except that the hot-melt adhesives for forming the first adhesive layer and second adhesive layer were changed to filmy hot-melt adhesives "Dan-Fuse (trademark)" (manufactured by Nitto Boseki Co., Ltd, thickness of the first adhesive layer: 100 μm, thickness of the second adhesive layer: 50 μm) composed of a polyester-based polyurethane resin having a melting point of 150° C., a melt viscosity of 11,800 Pa·s at 150° C. and a 100% modulus of 4.9 MPa.

Example 3

A fabric for marking according to the present invention was fabricated in the same manner as in Example 1 except that the hot-melt adhesives for forming the first adhesive layer and second adhesive layer were changed to filmy hot-melt adhesives "Dan-Fuse (trademark)" (manufactured by Nitto Boseki Co., Ltd, thickness of the first adhesive layer: 75 μm, thickness of the second adhesive layer: 30 μm) composed of a polyester-based polyurethane resin having a melting point of 150° C., a melt viscosity of 11,800 Pa·s at 150° C. and a 100% modulus of 5.0 MPa.

Comparative Example 1

A comparative fabric for marking was fabricated in the same manner as in Example 1 except that the hot-melt adhesives for forming the first adhesive layer and second adhesive layer were changed to filmy hot-melt adhesives (thickness of the first adhesive layer: 120 μm, thickness of the second adhesive layer: 50 μm) composed of a polyurethane resin having a melting point of 105° C., a melt viscosity less than 100 Pa·s at 150° C. and a 100% modulus of 11.5 MPa.

This Comparative Example 1 is a comparative example where the specific thermoplastic polyurethane resin was not used as the constituent material of the first adhesive layer and second adhesive layer.

Comparative Example 2

A comparative fabric for marking was fabricated in the same manner as in Example 1 except that the hot-melt adhesives for forming the first adhesive layer and second adhesive layer were changed to filmy hot-melt adhesives (thickness of the first adhesive layer: 100 μm, thickness of the second adhesive layer: 70 μm) composed of a polyurethane resin having a melting point of 110° C., a melt viscosity of 400 Pa·s at 150° C. and a 100% modulus of 9.1 MPa.

This Comparative Example 2 is a comparative example where the specific thermoplastic polyurethane resin was not used as the constituent material of the first adhesive layer and second adhesive layer.

Comparative Example 3

The same materials as those used in Example 1 were used to fabricate a comparative fabric for marking in accordance with the following process. A mark image was formed on a front surface of the colored layer (20) by printing by means of an ink jet printer, a front surface of the colored layer (20), on which the mark image had been formed, was brought into contact with a back surface of the support film (42) to laminate and stick them on each other, and the first adhesive layer (11) was further laminated on a back surface of the colored layer (20), thereby obtaining a laminated structure of the support film (42), the colored layer (20) and the first adhesive layer (11). The thus-obtained laminated structure was cut by a cutting plotter, thereby obtaining a fabric for marking having no surface layer.

This Comparative Example 3 is a comparative example where both surface layer and second adhesive layer are not provided as layer components of the fabric for marking.

Comparative Example 4

A mark image was formed on "Print Sheet LIJ"(manufactured by BANDO ELASTOMER CO., LTD.) by printing by means of an ink jet printer, this sheet was cut by a cutting plotter, thereby fabricating a comparative fabric for marking.

Comparative Example 5

A mark image was formed on "Ink Jet Sheet SP-J III" (manufactured by SANTO-SHOJI CO., LTD.) by printing by means of an ink jet printer, this sheet was cut by a cutting plotter, thereby fabricating a comparative fabric for marking.

<Bonding of Fabric for Marking (Formation of Mark)>

Each of the fabrics for marking obtained in Examples 1 to 3 and Comparative Examples 1 to 5 was set at a central position on a back side of a uniform composed of polyester fibers and heat-bonded under pressure for 15 seconds under conditions of a pressure of 500 g/cm$^2$ and a temperature of 160° C. from the side of the support film, the support film was then peeled, and heat-bonding under pressure was conducted for 15 seconds again under the same conditions, whereby the fabric for marking was bonded to form a mark so as to make evaluation as to the following items. The results are shown in the following Table 1.

(1) Adhesion:
With respect to the mark formed on the uniform, a mark-formed surface was subjected to a rubbing treatment for 5 minutes at 2,000 rpm by means of an Accelerotor Type Tester, and the condition of the bonding of the fabric for marking to the uniform (adherend) was then visually observed to evaluate the fabric for marking on the basis of the following standard.
(Evaluation Standard)
A: No peeling of the fabric for marking is observed, and the fabric is strongly bonded.
B: Slight peeling is observed in a part of the fabric for marking.
C: Peeling of the fabric for marking is markedly observed.
(2) Adhesion Durability:
Each uniform, on which the mark had been formed, was subjected to a washing resistance test in accordance with JIS L 1096 F-2 Method to evaluate the fabric for marking on the basis of the following standard.
(Evaluation Standard)
A: A level of rating 5 in JIS Criteria.
B: A level of rating 4 in JIS Criteria.
C: A level of rating 3 in JIS Criteria.
D: A level of rating 2 to 1 in JIS Criteria.
(3) Stretchability:
After tensile force was applied in such a manner that the mark formed on each uniform elongates by 100% (the length thereof doubles), this tensile force was released, and this stretching operation was repeated 100 times to measure a recovery rate from the elongation 1 minute after the stretching operation, thereby evaluating the fabric for marking on the basis of the following standard.
(Evaluation Standard)
A: 90% or more.
B: 85% or more, but less than 90%.
C: 80% or more, but less than 85%.
D: Less than 80%.
(4) Resistance to Color Fading (Abrasion Resistance):
The condition of appearance of the mark after the rubbing treatment by the Accelerotor Type Tester in the item (1) was conducted was visually observed to evaluate the fabric for marking on the basis of the following standard.
(Evaluation Standard)
A: The condition of appearance before the test is conducted is retained.
B: Slight rubbing-off is observed in a part of the mark.
C: Rubbing-off of the mark is markedly observed.
(5) Resistance to Color Fading (Chlorine Resistance):
Each mark formed on the uniform was treated in accordance with JIS L 0884 B Method to evaluate the fabric for marking as to chlorine resistance on the basis of the criteria in JIS L 0801-9.
(Evaluation Standard)
A: A level of rating 5 in JIS Criteria.
B: A level of rating 4 in JIS Criteria.
C: A level of rating 3 in JIS Criteria.
D: A level of rating 2 to 1 in JIS Criteria.
(6) Resistance to Color Fading (Light Fastness):
Each mark formed on the uniform was treated in accordance with JIS L 0842 to evaluate the fabric for marking as to light fastness on the basis of the criteria of color fastness in JIS L 0801-10.
(Evaluation Standard)
A: A level of rating 5 in JIS Criteria.
B: A level of rating 4 in JIS Criteria.
C: A level of rating 3 in JIS Criteria.
D: A level of rating 2 to 1 in JIS Criteria.

[Table 1]

|  |  | Example | | | Comparative Example | | | | |
|---|---|---|---|---|---|---|---|---|---|
|  |  | 1 | 2 | 3 | 1 | 2 | 3 | 4 | 5 |
| Physical properties of hot-melt adhesive forming adhesive layer | Melting point [° C.] | 150 | 150 | 150 | 105 | 110 | 150 | — | — |
|  | Melt viscosity (150° C.) (Pa·s) | 11,800 | 11,800 | 11,800 | <100 | 400 | 11,800 | — | — |
|  | $M_{100}$ [MPa] | 4.0 | 4.9 | 5.0 | 11.5 | 9.1 | 4.0 | — | — |
| Presence of surface layer |  | Present | Present | Present | Present | Present | Absent | Absent | Absent |
| Evaluation | Adhesion | A | A | A | A | A | A | A | B |
|  | Adhesion durability | A | A | A | A | A | A | A | A |
|  | Stretchability | A | A | A | D | C | A | D | D |
| Resistance to color fading | Abrasion resistance | A | A | A | A | A | B | B | B |
|  | Chlorine resistance | A | A | A | A | A | D | B | D |
|  | Light fastness | B | B | B | B | B | B | B | B |

DESCRIPTION OF CHARACTERS

1A Fabric for marking
1B Fabric for marking
10 Adhesive layer
11 First adhesive layer
12 Second adhesive layer
13 Third adhesive layer
20 Colored layer (interlayer)
25 Reflective layer (interlayer)
30 Surface layer
41 Release layer
42 Support layer
50 Sublimation-preventing layer

The invention claimed is:
1. A laminated structure for marking, having a laminated structure comprising:
a first adhesive layer formed of a hot-melt adhesive composed of a thermoplastic polyurethane resin having physical properties including a melting point of 125 to 165° C., a melt viscosity of 8,000 to 15,000 Pa·s at 150° C., and a 100% modulus of 2 to 8 MPa,
an interlayer laminated on a front surface of the first adhesive layer and formed of a thermosetting polyurethane resin which is stretchable and opaque,
a second adhesive layer laminated on a front surface of the interlayer and formed of the hot-melt adhesive composed of the thermoplastic polyurethane resin having the above-described physical properties, and a surface layer laminated on a front surface of the second adhesive layer and formed of a thermosetting polyurethane resin which is stretchable and transparent, wherein a mark image has been formed on the front surface of the interlayer or on a back surface of the surface layer.

2. The laminated structure for marking according to claim 1, wherein the thickness of the first adhesive layer is 50 to 150 μm, the thickness of the interlayer is 10 to 50 μm, the thickness of the second adhesive layer is 10 to 150 μm, and the thickness of the surface layer is 10 to 50 μm.

3. The laminated structure for marking according to claim 1, wherein the mark image is formed by printing with a dye containing a sublimate dye or a pigment.

4. The laminated structure for marking according to claim 1, wherein the surface layer is subjected to at least one working selected from the group consisting of embossing, dimpling and satinizing.

5. The laminated structure for marking according to claim 1, wherein the hot-melt adhesive in each of the first adhesive layer and the second adhesive layer is composed of a polyester-based thermoplastic polyurethane resin.

6. The laminated structure for marking according to claim 1, wherein the interlayer is a colored layer.

7. The laminated structure for marking according to claim 1, wherein the interlayer is a reflective layer.

8. The laminated structure for marking according to claim 1, which further comprises a powdery material or a fibrous material contained in the interior of the second adhesive layer.

9. The laminated structure for marking according to claim 1, wherein a sublimation-preventing layer is provided between the first adhesive layer and the interlayer.

10. The laminated structure for marking according to claim 1, wherein a plurality of through-holes are formed so as to extend from a back surface of the first adhesive layer to the front surface of the surface layer.

11. The laminated structure for marking according to claim 2, wherein the mark image is formed by printing with a dye containing a sublimate dye or a pigment.

* * * * *